E. R. WALTERS & A. HUFFMAN.
PLANTER.
APPLICATION FILED MAR. 26, 1915.
1,162,001.
Patented Nov. 30, 1915.
2 SHEETS—SHEET 1.
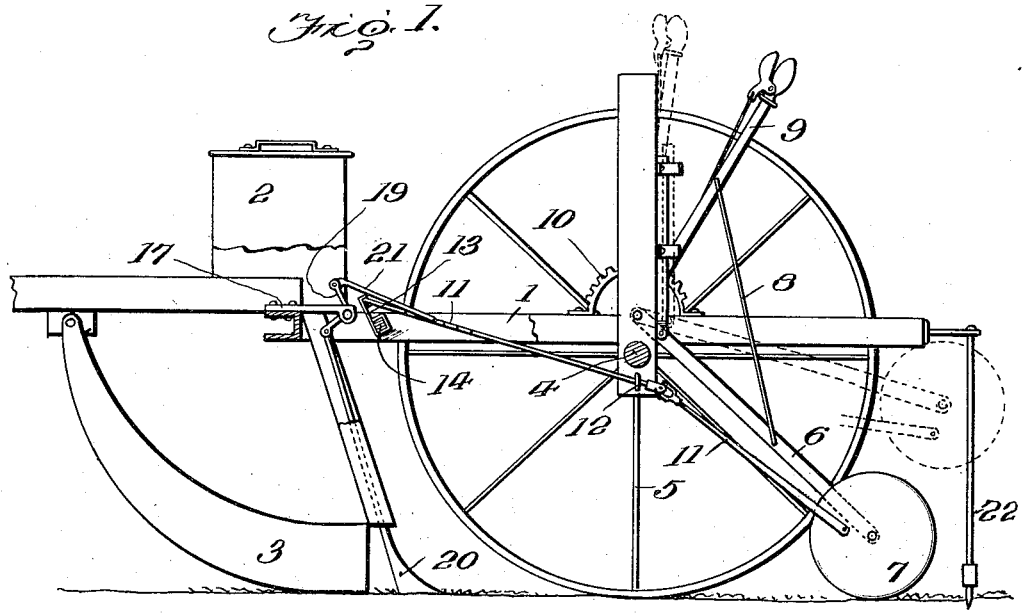
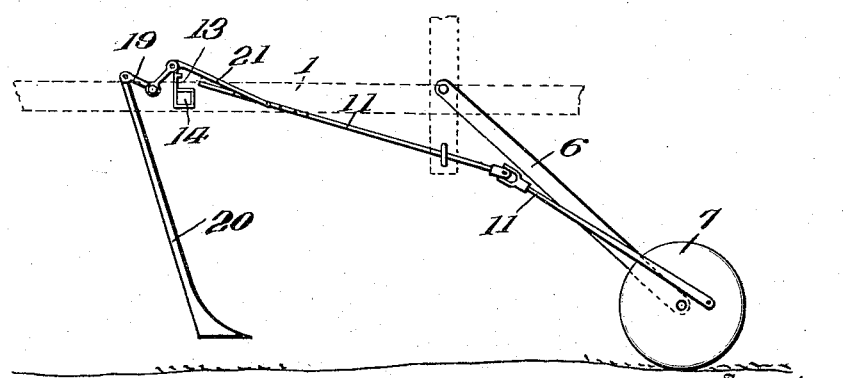

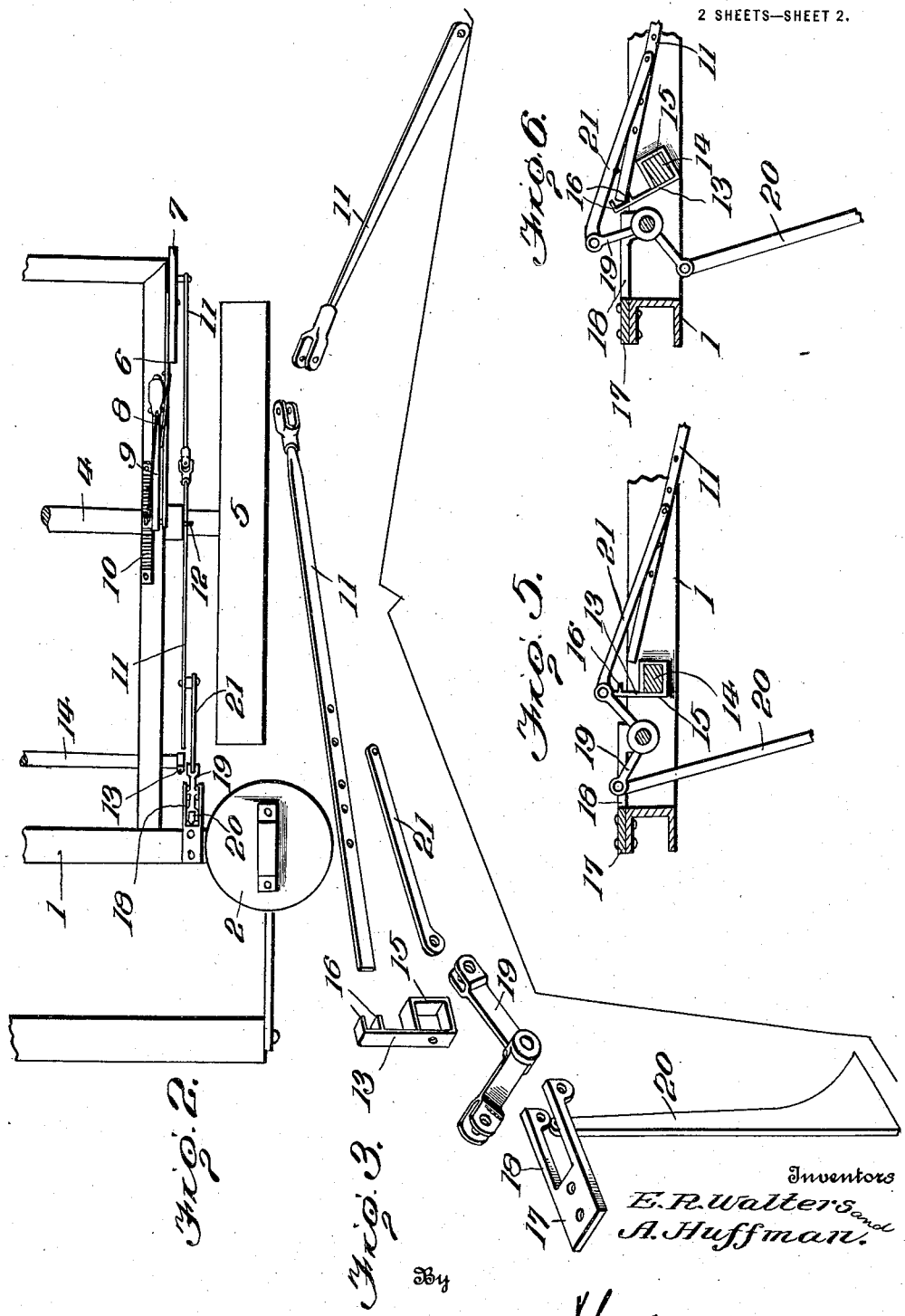

UNITED STATES PATENT OFFICE.

EDWARD R. WALTERS AND ARTHUR HUFFMAN, OF ARCADIA, OHIO.

PLANTER.

1,162,001.
Specification of Letters Patent.
Patented Nov. 30, 1915.

Application filed March 26, 1915. Serial No. 17,202.

*To all whom it may concern:*

Be it known that we, EDWARD R. WALTERS and ARTHUR HUFFMAN, citizens of the United States, residing at Arcadia, in the county of Hancock and State of Ohio, have invented certain new and useful Improvements in Planters, of which the following is a specification.

This invention relates to planters, and has for its object the provision of simple and efficient means whereby seeds may be planted in check rows without the use of a wire and whereby the hill at the beginning of a row may be easily and accurately alined with the hill at the end of a row previously planted.

The invention also seeks to provide a mechanism for the stated purpose which will be simple in construction and arrangement of its parts, easily manipulated and readily applied to any planter frame now in use.

These several stated objects, and such other incidental objects as will hereinafter appear, are attained in the mechanism illustrated in the accompanying drawings, and the invention resides in certain novel features which will be first fully described and then more particularly pointed out in the claims following the description.

In the drawings, Figure 1 is a side elevation of a portion of a planter having the invention embodied therein; Fig. 2 is a plan view of the same; Fig. 3 is a detail perspective view of the several operating parts disassembled but in their relative positions; Fig. 4 is a diagrammatic elevation of the improved mechanism; and Figs. 5 and 6 are enlarged detail views showing different positions of the parts in the operation of the same.

The frame 1 of the planter may be of any preferred construction and supports the hoppers 2 over runners or shoes 3 in the usual manner. The frame is supported upon an axle 4 carrying ground wheels 5, and a seat for the driver is usually mounted upon the frame, the seat, however, being omitted in the present illustration as unnecessary and also to permit the particular improvements to be more fully and clearly disclosed.

A link or hanger 6 is pivoted at its upper end to the frame 1 at a point spaced inwardly from the ground wheel 5, and upon the lower end of the said hanger is mounted a check wheel 7 which is equal in circumference to the distance between hills, as usually planted. A link 8 connects the said hanger with an operating lever 9 which is fulcrumed upon the frame 1 and is adapted to co-act with a rack 10 upon the frame so as to be maintained in a set position. By manipulating the lever 9, the hanger 6 with the check wheel 7 will be raised or lowered, as will be readily understood.

Pivoted eccentrically to the outer face of the check wheel is the lower end of a jointed pitman 11 which has its intermediate portion supported in any convenient manner, as by a guide 12, upon the frame 1, and the forward upper end of the said pitman is adapted to engage a finger 13 secured rigidly to and projecting upwardly from the rock shaft 14 by which the seed discharging mechanism is tripped in the usual manner. The trip finger 13 is provided at its lower portion with a box 15 adapted to fit around an angular end portion of the rock shaft 14 whereby relative rotary movement of the shaft and the finger will be prevented, and upon the rear side of the finger at the upper end thereof are spaced lugs 16 which together form a socket to receive the forward end of the pitman 11, as will be readily understood and as is shown in Fig. 6.

Upon the frame 1, in advance of the rock shaft 14 and adjacent the same is secured a bracket 17 which is illustrated as consisting of a plate having rearwardly projecting branches or arms 18 between the ends of which is pivotally mounted an angle lever 19. One arm of this angle lever extends forwardly from its pivot or fulcrum, and to the end of said arm is pivoted a hill marker 20 which extends downwardly therefrom and may be guided in any convenient manner from the seed spout or other fixed part of the machine. The other arm of the angle lever extends upwardly from its pivot or fulcrum and to the end of said arm is pivoted the front end of a link 21 having its rear end pivoted to the pitman 11. The pivotal point is preferably shiftable so that the throw of the angle lever and, consequently, the movement of the hill marker 20 may be regulated according to varying circumstances and the peculiarities of the planter to which the device is applied. The planter will preferably be equipped with the usual trailer or row marker 22 which will be operated in the usual manner.

The construction and arrangement of the several parts being thus made known, it is thought the operation and the advantages of the same will be readily understood. The machine is drawn over the field in the usual manner, and the seed will be dropped at the end of each complete revolution of the check wheel 7. In Fig. 1, the parts are shown with the hill marker down and the rock shaft 14 tripped to permit a discharge of seed, while in Fig. 4 the rock shaft is shown in its normal position, and the hill marker is raised.

It will be readily noted that, when the lower end of the pitman 11 is carried by the check wheel 7 to its rearmost position, the front end of the said pitman will be released from the finger 13 and the link 21 will have exerted a pull upon the angle lever 19 to raise the hill marker. As the check wheel moves forwardly, the pitman will be again advanced and the angle lever swung about its pivot so as to lower the hill marker. The parts are so timed that, when the front end of the pitman enters between the lugs 16 and impinges against the trip finger 13, the angle lever 19 will be swung about its pivot so that the hill marker will be lowered and will strike the ground at the same instant that the discharged seed reaches the ground, thereby marking the location of the hill. The action just described, of course, occurs when the check wheel has carried the pivot point of the pitman 11 to its foremost position, and as the travel of the machine continues the said point will recede relative to the machine and, consequently, the pitman will be returned to the position illustrated in Fig. 5, permitting the rock shaft 14 to return it to its normal position in the usual manner. The angle lever 19 will be simultaneously rocked so as to lift the hill marker from the ground. When the end of a row has been reached, the team is turned so that the machine will be brought into proper position over the line defined by the trailer or line marker 22, the lever 19 having been thrown forward so as to lift the check wheel from the ground. After the machine has been turned, the driver will reach down and manually adjust the check wheel so that the hill marker and the seed dropping mechanism will be set to plant the first hill in alinement with the last hill in the row just planted. The lever 9 is then swung rearwardly so as to lower the check wheel 7 to the ground and may be set to hold the said wheel down with any desired pressure so that it will operate positively during the travel of the machine. The team is then driven across the field so as to plant the new row of hills, and the operation is repeated until the entire field has been planted.

It will be readily noted that the device is exceedingly simple in the construction and arrangement of its parts and is free of all complicated operations so that it is not liable to get out of order and will withstand long continued use. The parts are arranged between the ground wheel and the side of the frame so that they are not apt to strike against trees or other objects in the field and be thereby damaged.

Having thus described the invention, what is claimed as new is:—

1. The combination with a seed dropping shaft, and a hill marker, of a check wheel adapted to run upon the ground, a pitman pivoted at its lower end to said check wheel, means in the path of but free from said pitman to rock the seed dropping shaft, and positive connections between said pitman and the hill marker.

2. The combination of a seed dropping shaft, a trip finger rigid therewith, a check wheel adapted to run upon the ground, and a pitman pivoted at its rear end directly to said check wheel and extending forwardly therefrom to impinge against said trip finger.

3. The combination with a seed dropping shaft, of a trip finger rising therefrom and provided with spaced lugs at its upper end, a check wheel adapted to run upon the ground, and a pitman pivoted to and actuated by said check wheel and adapted to engage between the said lugs on the trip finger.

4. The combination with a planter frame, and a seed dropping shaft thereon, of a check wheel supported from the planter frame, a pitman actuated by said wheel and adapted to rock the seed dropping shaft, an angle lever mounted upon the frame adjacent the seed-dropping shaft, a hill marker suspended from said angle lever, and a link connecting said angle lever with the pitman.

5. The combination with a planter frame, and a seed dropping shaft thereon, of a check wheel supported from the frame, a pitman connected directly to said wheel and adapted to rock the seed dropping shaft, a hill marker, a lever mounted upon the frame and pivoted at one end to upper end of said hill marker, and a link pivoted to said lever and adjustably pivoted to the pitman.

6. The combination with a planter frame, and a seed-dropping shaft mounted thereon, of a finger projecting from said shaft, a check wheel suspended from the frame, a pitman pivoted at its rear end to said check wheel and having its front end arranged to impinge against the finger on the seed-dropping shaft, an angle lever fulcrumed upon the frame adjacent the seed-dropping shaft, a hill-marker pivoted to and depending from one end of said angle lever, and a link having its front end pivoted to one end of said lever and its rear end pivoted to the pitman.

In testimony whereof we affix our signatures in presence of two witnesses.

EDWARD R. WALTERS. [L. S.]
ARTHUR HUFFMAN. [L. S.]

Witnesses:
NORMAN HUFFMAN,
FRANK G. FIELDING.

Copies of this patent may be obtained for five cents each, by addressing the "Commissioner of Patents, Washington, D. C."